No. 750,172. PATENTED JAN. 19, 1904.
H. T. CRAVEN.
DIFFERENTIAL GEARING.
APPLICATION FILED MAY 14, 1903.
NO MODEL. 2 SHEETS—SHEET 1.

Witnesses
R. A. Boswell
George M. Anderson

Inventor
H. T. Craven
By E. W. Anderson
his Attorney

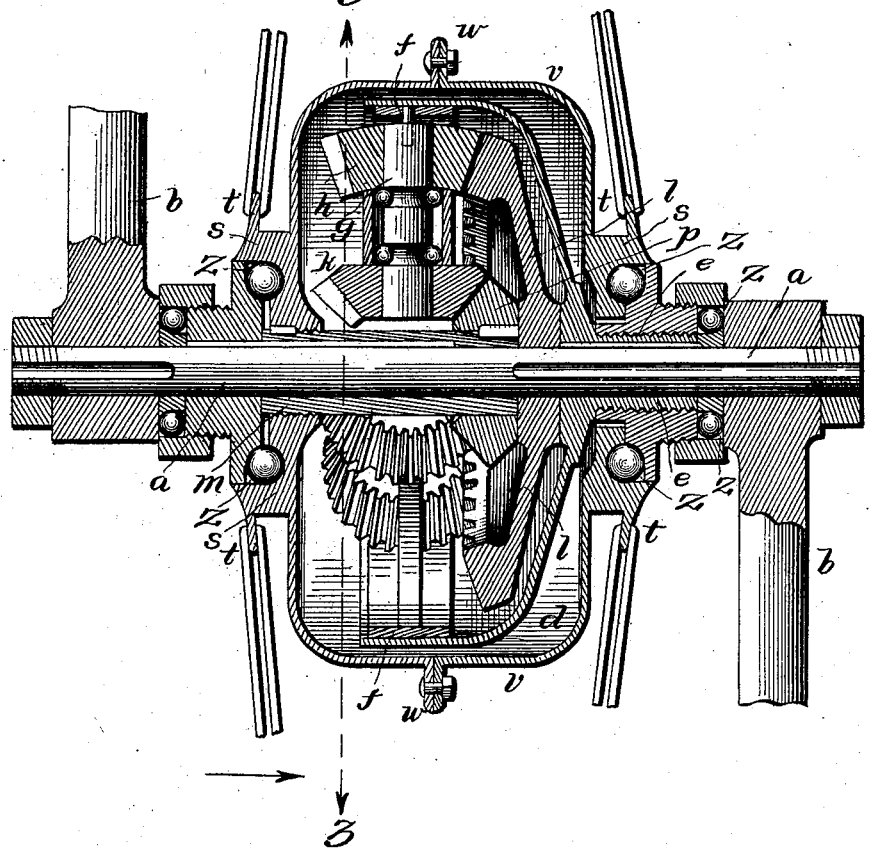

No. 750,172.

Patented January 19, 1904.

UNITED STATES PATENT OFFICE.

HENRY T. CRAVEN, OF VINELAND, NEW JERSEY.

DIFFERENTIAL GEARING.

SPECIFICATION forming part of Letters Patent No. 750,172, dated January 19, 1904.

Application filed May 14, 1903. Serial No. 157,135. (No model.)

*To all whom it may concern:*

Be it known that I, HENRY T. CRAVEN, a subject of the King of England, and a resident of Vineland, in the county of Cumberland and State of New Jersey, have made a certain new and useful Invention in Differential Gearing; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1:
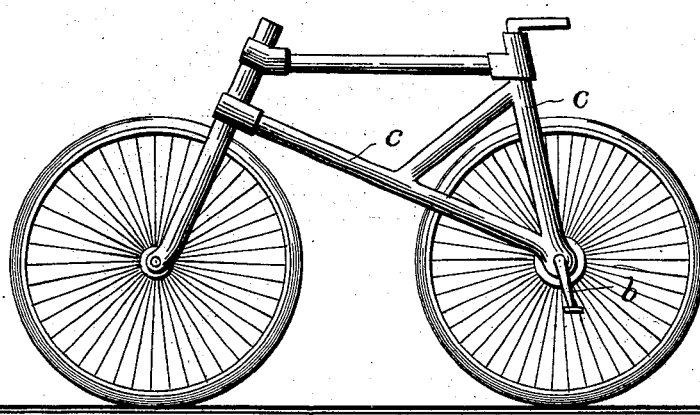
Figure 3:
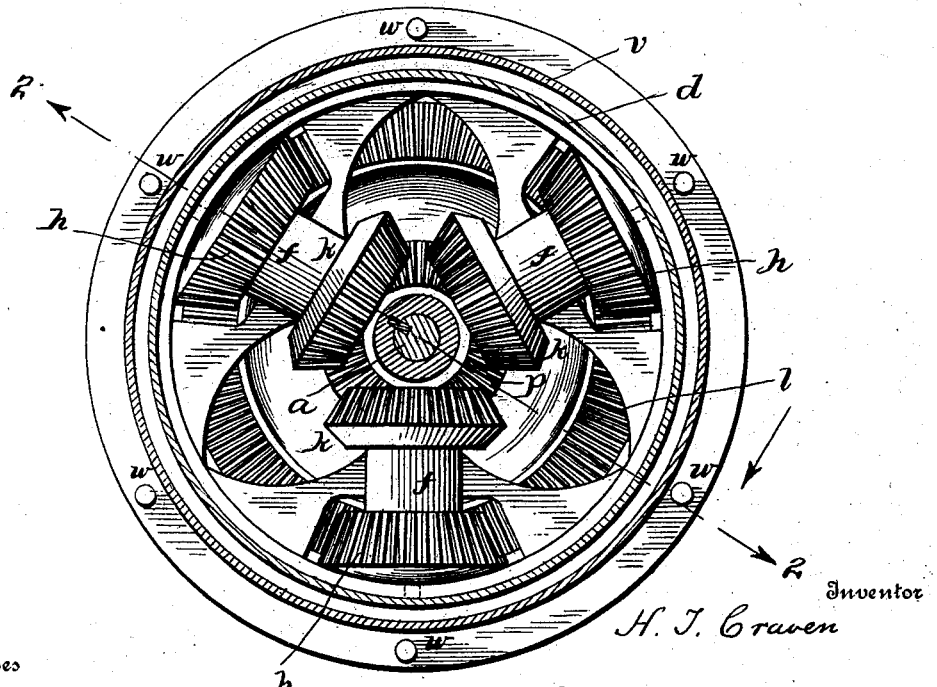

Figure 1 is a side elevation of a bicycle having the invention applied thereto. Fig. 2 is a cross-section through the crank-shaft of the same. Fig. 3 is a section on the line 3 3, Fig. 2, with gearing removed from frame $c$.

The invention relates to differential gearing; and it consists in the novel construction and combinations of devices, as hereinafter set forth.

In the accompanying drawings the invention is illustrated in its application to a bicycle, and the letter $a$ designates the main driving-shaft or pedal-shaft, $b\ b$ the pedal-cranks, and $c$ the frame of the bicycle.

To the frame $c$ is attached the inner frame $d$ of the gearing, which is fixed thereto by means of its threaded-sleeve portion $e$, which forms a bearing for the pedal-shaft. The gear-frame $d$ is preferably of trifurcate form, having bearings at $f$ for the shafts $g$ of the double gears, which are radially arranged in said frame. The double gears consist each of an outer bevel-pinion $h$ and an inner pinion-wheel $k$, secured, respectively, to the outer and inner ends of the shaft $g$.

On the pedal-shaft $a$ is secured a large bevel-wheel $l$, which engages the outer bevel-pinion $h$, while the inner bevel-pinion $k$ engages the bevel-pinion $p$ of a sleeve-shaft $m$, which turns on the pedal-shaft $a$ as on a journal. To the sleeve-shaft $m$ is secured the hub $s$ of the driven wheel, the spokes of which may be connected to the hub-rings $t$. The hub $s$ is provided with flanged extensions $v$, which are designed to form a casing for the hub, which is usually made in two portions bolted together through their circumferential flanges $w$. Ball-bearings are provided between the journal portions and the rotating parts, as indicated at $z$. The bevel-pinion $p$ being usually of much less diameter than the bevel-wheel $l$, when the latter is turned by the revolution of the pedals the bevel-pinion $p$ and its sleeve and the connected bicycle-wheel are rotated with such increased rapidity as the difference between the diameters of the bevel-wheel and the sleeve-pinion provide for. Usually the inner bevel-pinion of the shaft $g$ is a miter-wheel, as is the bevel-pinion of the sleeve-shaft, it being designed to avoid end thrust of said sleeve-shaft as much as possible. This invention is designed to be applied to other machines as well as bicycles, and particularly to automobiles, water-wheels, propellers, and windmills. The bipartite-casing hub is designed to facilitate the assembling of the devices within its closure.

The radial shafts $g$ lie in a plane at right angles to the driving-shaft, and their inner ends are close to the sleeve-shaft in such wise that the arrangement is very compact and secure.

Having described this invention, what I claim, and desire to secure by Letters Patent, is—

1. The combination with the radial shafts and the two pinions on each such radial shaft, of the main driving-shaft, the large gear-wheel fixed to said driving-shaft, the sleeve-shaft, and its pinion journaled on the driving-shaft, the inner frame carrying the radial shafts, and the flanged inclosing hub of the driven wheel, substantially as specified.

2. The combination with the radial shafts, and the two bevel-pinions on each such radial shaft, of the main driving-shaft, the large bevel-wheel fixed to said driving-shaft, the sleeve-shaft and its bevel-pinion journaled on the driving-shaft, the inner frame carrying the radial shafts, and the flanged inclosing hub of the driven wheel, substantially as specified.

3. The combination with the radial shafts, and the two bevel-pinions on each such radial shaft, of the main driving-shaft, the large bevel-wheel fixed to said driving-shaft, the sleeve-shaft, and its bevel-pinion journaled on the driving-shaft, the inner frame carrying the radial shafts, and the casing extensions of the hub of the driven wheel, substantially as specified.

4. The combination with the radial shafts, the inner bearing-frame therefor secured to the main frame, and the double pinions on said radial shafts, of the main frame, the driving-shaft, the bevel-wheel secured on said driving-shaft, the sleeve-shaft, and its pinion journaled on said driving-shaft, and the casing extensions of the hub inclosing the inner frame and gearing, substantially as specified.

5. The combination with a frame, of the radial shafts and their double pinions, the gear-shaft frame fixed to said main frame, the driving-shaft, and its large bevel-wheel, the sleeve-shaft and its bevel-pinion journaled on said driving-shaft, and the hub and its casing extensions, of the driven wheel, substantially as specified.

6. In a bicycle, the combination with the main frame, and a trifurcate gear-frame secured thereto, of the driving-shaft, the sleeve-shaft, and pinion journaled on said driving-shaft, the bevel-wheel secured to the driving-shaft, the radial shafts bearing in said gear-frame, the double pinions of said radial shafts, and the hub and its flanged extensions inclosing said gear-frame, bevel-wheel, sleeve-shaft and pinion, and the double pinions of said radial shafts, substantially as specified.

7. The combination with the driving-shaft, and the large bevel-wheel secured thereto, of the radial shafts in a plane at right angles to the driving-shaft, the double pinions, the sleeve-shaft in the driving-shaft, its bevel-pinion, the fixed bearing-frame of the radial shafts, and the hub portion of the driven wheel inclosing such fixed frame and the gearing, substantially as specified.

In testimony whereof I affix my signature in presence of two witnesses.

HENRY T. CRAVEN.

Witnesses:
DEAN MACGEORGE,
W. W. BENTHALL.